United States Patent
Mills

(10) Patent No.: US 6,661,969 B2
(45) Date of Patent: Dec. 9, 2003

(54) COLLAPSIBLE PHOTOGRAPHIC FILM WEB

(76) Inventor: William B. Mills, 65 E. Washington St., Apt. 4207, N. Attleboro, MA (US) 02760

( * ) Notice: Subject to any disclaimer, the term of this patent is extended or adjusted under 35 U.S.C. 154(b) by 0 days.

(21) Appl. No.: 10/317,961

(22) Filed: Dec. 12, 2002

(65) Prior Publication Data

US 2003/0081946 A1 May 1, 2003

Related U.S. Application Data

(62) Division of application No. 09/723,007, filed on Nov. 27, 2000.

(51) Int. Cl.[7] .............................................. G03B 17/02
(52) U.S. Cl. .......................................................... 396/6
(58) Field of Search .............................. 396/6, 30, 387, 396/399, 365, 366, 517, 395; 430/496

(56) References Cited

U.S. PATENT DOCUMENTS

| | | | | |
|---|---|---|---|---|
| 497,884 A | * | 5/1893 | Krause et al. | 430/496 |
| 1,140,877 A | * | 5/1915 | Cocanari | 396/365 |
| 3,677,152 A | * | 7/1972 | Dierks | 396/411 |
| 4,645,322 A | * | 2/1987 | Stella et al. | 396/366 |
| RE32,558 E | * | 12/1987 | Chan | 396/395 |

* cited by examiner

*Primary Examiner*—Christopher Mahoney
(74) *Attorney, Agent, or Firm*—Barlow, Josephs & Holmes, Ltd.

(57) ABSTRACT

A collapsible photographic film web for a camera with a compact configuration and that may use standard 35 mm film is disclosed. The photographic film web includes light-sensitive medium incorporated within a collapsible photographic film strip or individual film frames residing on a collapsible film carrier web. The collapsible photographic film web enables a photographic camera to be as compact as possible while using film that remains compatible with standard film processing equipment.

7 Claims, 17 Drawing Sheets

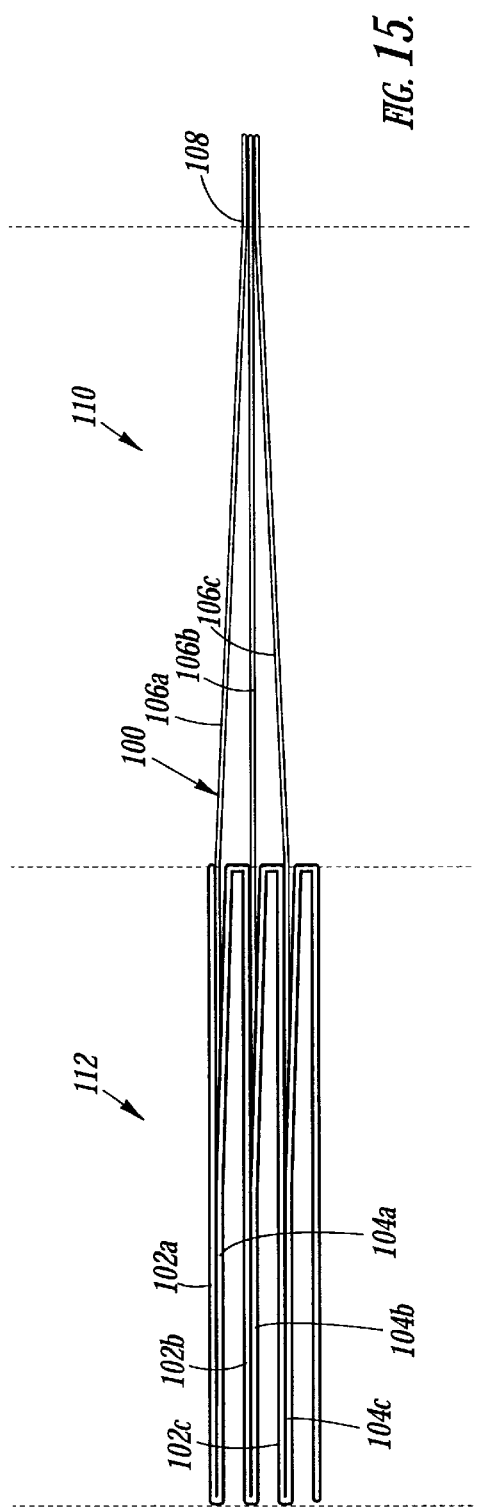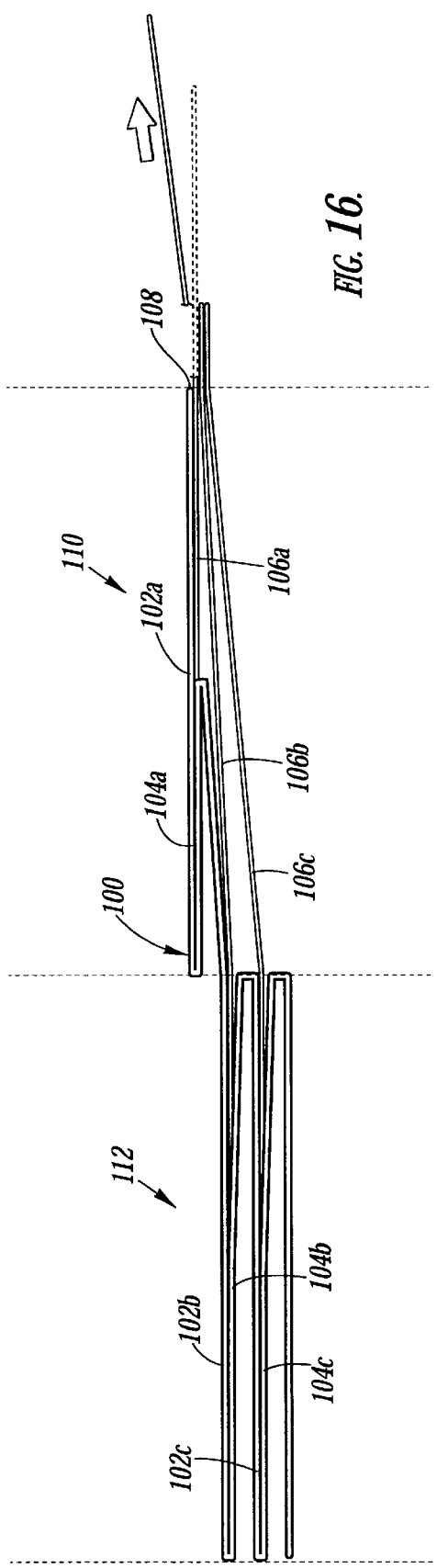

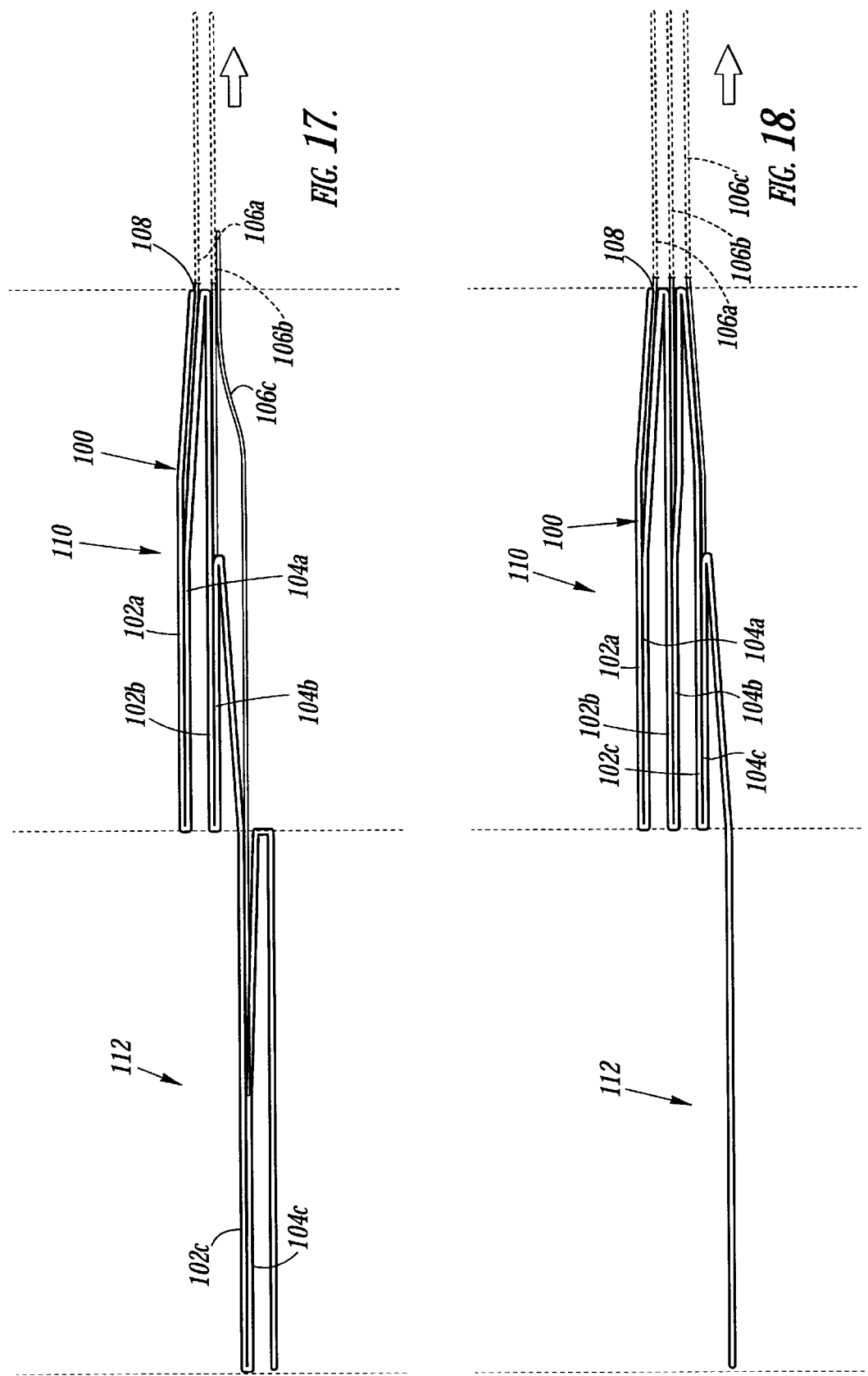

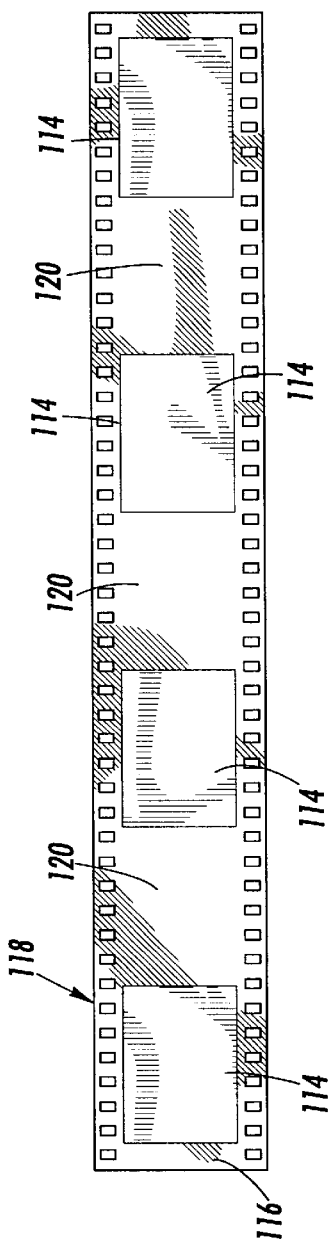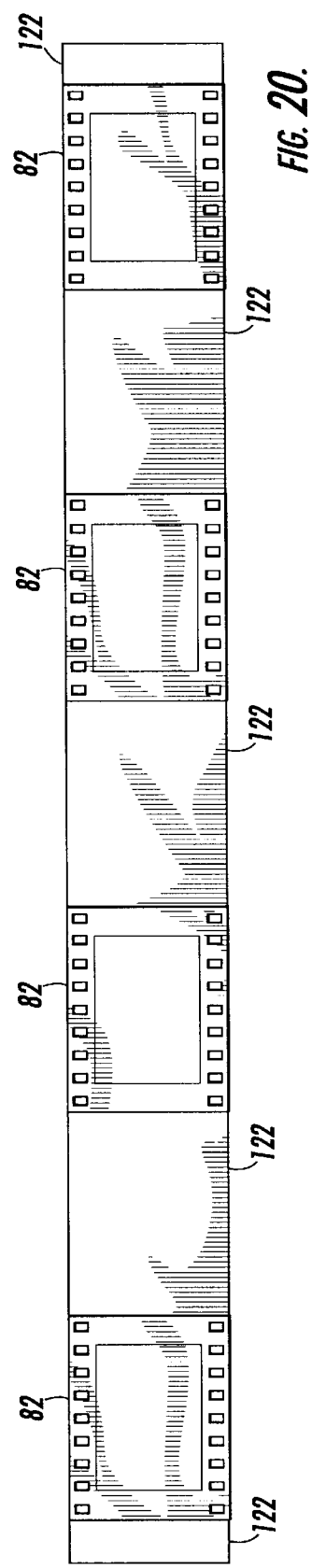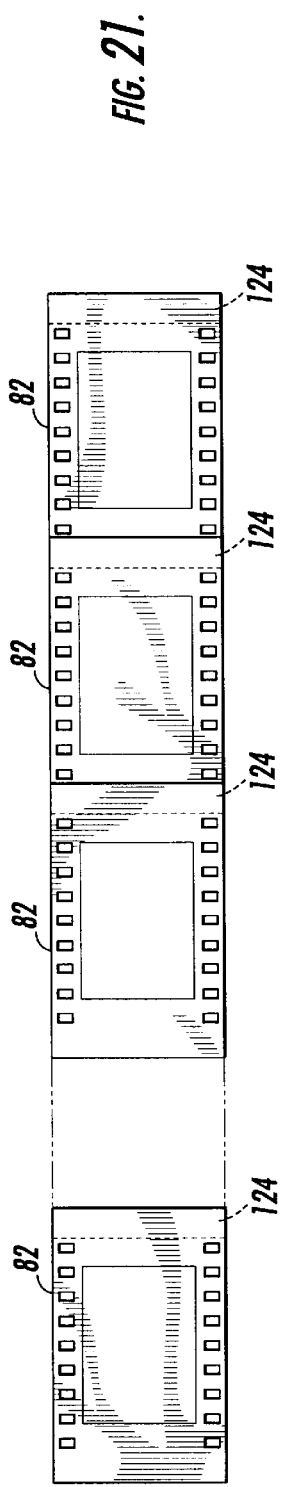
FIG. 19.
FIG. 20.
FIG. 21.

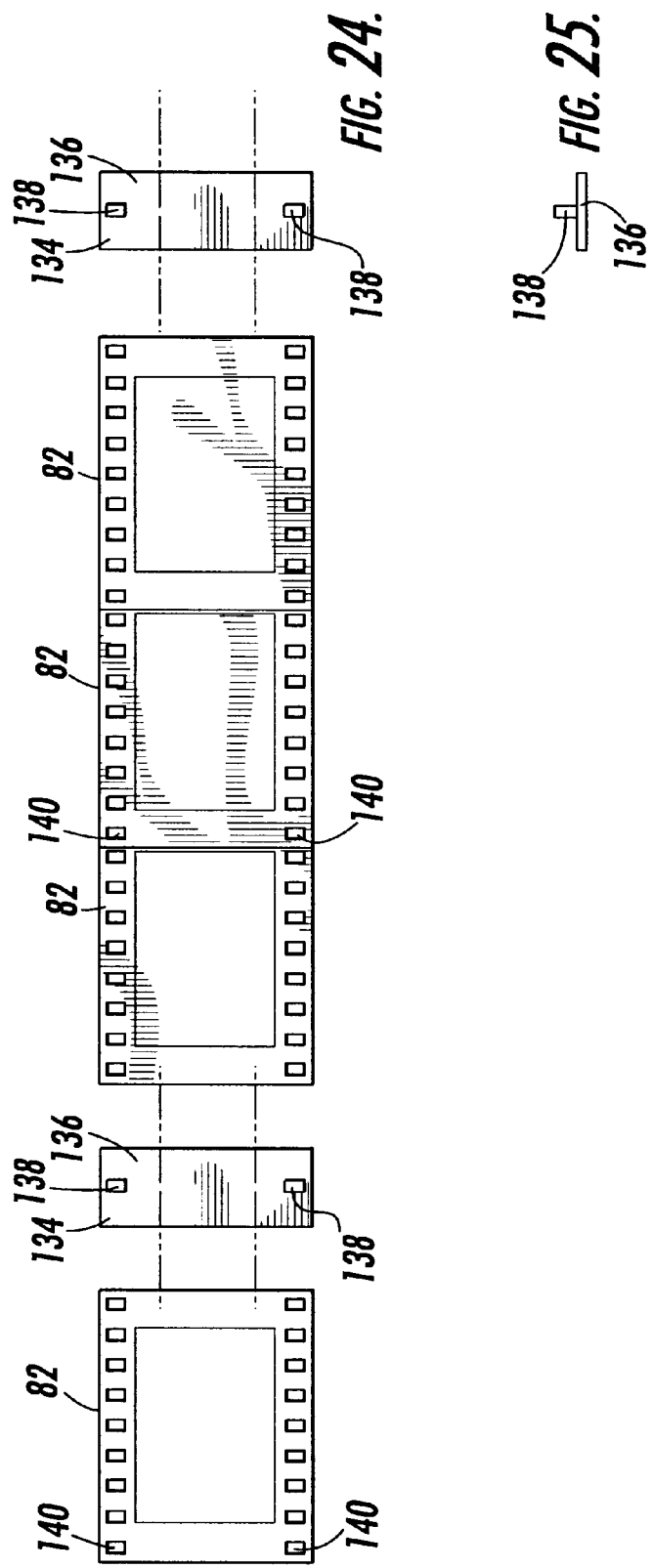

COLLAPSIBLE PHOTOGRAPHIC FILM WEB

CROSS REFERENCE TO RELATED APPLICATIONS

This application is a divisional of U.S. Ser. No. 09/723,007, filed Nov. 27, 2000.

BACKGROUND OF THE INVENTION

The present invention, relates generally to a filmstrip for a photographic camera. More specifically, the present invention relates to a collapsible filmstrip for a compact or collapsible camera that is capable of using standard 35 mm photographic film.

The sale of photographic film and single-use pre-loaded cameras to amateur photographers is a major industry worldwide. The market for these products is almost entirely "event-driven" in that the consumer purchases the film or the single-use camera because they intend to take photographs at a pre-planned event, such as a birthday party, wedding, and the like. Individuals do not typically carry a camera at all times for the capture of "impulse" photographs of non-planned events due to the bulk and weight of current design cameras and film, which inhibits their "constant carry". This inconvenient size is largely the result of employment of traditional rolled film and rolled film transport mechanisms, which cannot be collapsed or compressed to achieve a smaller camera mass. As a result, the volume of film sold and developed is a fraction of its total potential usage. While extremely compact cameras have been developed and marketed in the past, such as the Minox-type cameras, the goal of these cameras was concealment, they still exhibited enough volume and weight so as to make them unsuitable for continuous carry, they were of expensive design, and importantly, they employed a specialized film which is not compatible with "fast-turnaround" one-hour film developing establishments geared for processing standard 35 mm film.

Therefore, in view of the concerns discussed above, it would be desirable for a camera to employ a collapsible filmstrip that enables it to be as compact as possible, such as in the configuration of a credit card for easy transport at all times. It is also desirable for a such a collapsible filmstrip to be very inexpensive to manufacture to reduce the overall cost to the consumer. Further, it is also desirable for a collapsible filmstrip to be compatible with a film transport that is easy to operate. It is further desirable for the collapsible filmstrip to be easy and inexpensive to develop while achieving high picture quality.

SUMMARY OF THE INVENTION

The present invention preserves the advantages of prior art filmstrips. In addition, this filmstrip provides new advantages not found in prior art filmstrips, and overcomes many of the disadvantages of such filmstrips.

The invention is generally directed to a novel and unique collapsible filmstrip with particular application in taking quality photographs using standard 35 mm film. The collapsible filmstrip of the present invention enables compact transport of a camera which is well-suited for emergency use, and the like. The collapsible filmstrip of the present invention is compatible with film transports that permit fast transport of exposures and simplified camera operation.

The preferred embodiment of the collapsible filmstrip of the present invention includes frames of photographic film that reside in a compact camera which has a front panel. A rear panel is positioned substantially parallel and co-extensive to the front panel. A band of resilient material extends from approximately near the outer edge of the front panel to approximately near the outer edge of the rear panel. The rear panel is controllably movable relative to the front panel. An outer housing sheet member includes a number of strut members extending therefrom. The outer housing sheet member is affixed to the exterior side of the front panel. The strut members engage with the rear panel to fix the rear panel a distance away from the front panel to obtain the proper focal length. With the strut members in place, both front and rear panels may remain essentially planar, providing the rectangular outer shape of a standard camera. A back cover is affixed to the exterior side of the rear panel. A light-sensitive medium, such as photographic film, is positioned between the rear panel and the back cover. A shutter controls the light imparted to the light-sensitive medium. The light-sensitive medium is exposed to a scene through the lens. The light-sensitive medium may be separate individually stacked photographic film frames, a fan folded photographic film strip or individual film frames residing on a film carrier web. When individual frames are used, they may be assembled into a continuous strip configuration for development using standard photographic equipment.

The credit card camera is originally packaged, for example, at the point of purchase in a compact configuration substantially equal to the size and configuration of a standard credit card. A label which holds the camera in a closed position is removed, and the camera is then fully opened to obtain the proper focal length. The camera is retained in this operational condition by a series of struts about the periphery of the camera. To take a picture, the camera is aimed at the subject scene and the shutter is actuated by depressing a button at the top of the camera. The film is then advanced in accordance with the particular film transport employed. Such film transfer will be discussed in detail below. After all of the film is exposed, the camera, or a removable film cartridge, can be sent to a standard photographic film service for developing. The camera may be returned to a collapsed state for this purpose. Depending on the film transport employed, the film will be prepared accordingly so that it may be accommodated by a standard film developing service. Such preparation for film developing will be discussed in more detail below.

It is the intent of the present invention to provide a filmstrip that is of a shape and design so as to enable use in a compact camera that encourages constant and convenient carry by photographers for the capture of impulse as well as pre-planned photographs. It is further the intent to produce a collapsible filmstrip which can be employed in a credit card shaped "card camera" which may be constantly carried in an ordinary wallet, or on a key chain, for extended periods of time. Additionally, the present invention permits the collapsible filmstrip to use common 35 mm film compatible with development at "fast turnaround" one-hour film development establishments. It is further the intention of the present invention to enable extremely low-cost manufacture of a camera through elimination of the complex geared transport mechanisms to achieve a lower price for higher sales. Such a flat compact film design will also make mailing a one-time use camera version to a development facility easier and less expensive, as well as make it easier to package the camera with other consumer goods as a promotion.

It is therefore an object of the present invention to provide a collapsible filmstrip that can be utilized in a camera configuration similar to that of a standard credit card.

An additional object of the present invention is to provide a collapsible filmstrip that is inexpensive to manufacture.

Another object of the present invention is to provide a collapsible filmstrip that may employ standard 35 mm film.

It is another object of the present invention to provide a credit card camera, or a compact film cartridge employing a like film transport mechanism, that includes multiple frames of film for multiple pictures in a single camera.

It is a further object of the present invention to provide a collapsible filmstrip that can be employed in a camera that is lightweight and compact to facilitate carry at all times for emergency and impulse photography.

It is yet a further object of the present invention to provide a collapsible filmstrip for a camera that is suitable for carrying in a wallet.

It is another object of the present invention to provide a collapsible filmstrip that is compatible with a film transport that is simple to use.

It is a further object of the present invention to provide a collapsible filmstrip that can be used in a common and familiar "point and shoot camera" design.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

FIG. 15 is a side elevational view of an alternative film transport configuration showing a fan folded arrangement;

FIG. 16 is a side elevational view of the alternative film transport configuration of FIG. 15 with one film frame exposed;

FIG. 17 is a side elevational view of the alternative film transport configuration of FIG. 15 with two frames exposed;

FIG. 18 is a side elevational view of the alternative film transport configuration of FIG. 15 with all three film frames exposed;

FIG. 19 is a photographic film web for developing a number of film frames using standard photographic development equipment;

FIG. 20 is a first alternative photographic film web for developing a number of film frames using standard photographic development equipment;

FIG. 21 is a second alternative photographic film web for developing a number of film frames using standard photographic development equipment;

FIG. 24 is a fifth alternative photographic film web for developing a number of film frames using standard photographic development equipment;

FIG. 25 is a side elevational view of an alignment member used in the film web illustrated in FIG. 24;

DETAILED DESCRIPTION OF THE PREFERRED EMBODIMENT

Figure 1:
FIG. 1 is a perspective view of a packaged credit card camera in accordance with the present invention.

Referring first to FIG. 1, the general configuration prior to use of the credit card camera 10 of the present invention is shown. The credit card camera 10 is preferably packaged as shown in FIG. 1 which is generally of a size and configuration of a standard credit card. This configuration is about 2.125 inches wide, about 3.375 inches long and about 0.135 inches thick. A label 12 is preferably positioned on the top surface 14 of the camera 10 to provide instructions regarding the operation of the camera 10. While this is a preferred configuration, other configurations may be employed and still be within the scope of the present invention. This packaged configuration is for shipping, storage and transport of the camera 10. For example, the compact configuration of the camera 10 makes it well-suited for storage in a user's wallet (not shown). As a result of this size and configuration, the camera 10 may be a "constant carry" item so that it will be available for use at all times for emergencies, unplanned events, and the like. The credit card camera 10 in the packaged form in FIG. 1 may be, for example, sold as a standalone unit or may be easily sold in a blister card for ease of point of purchase sale.

Figure 2:
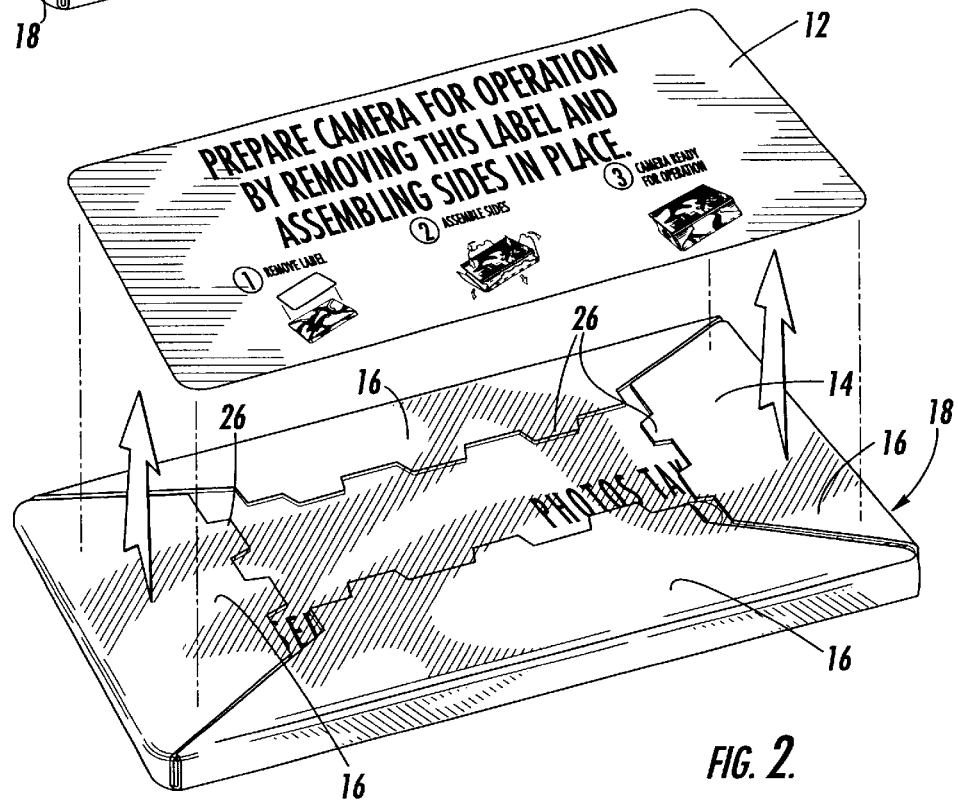
FIG. 2 is a perspective view of the packaged credit card camera in FIG. 1 with sealing label removed.
Figure 3:
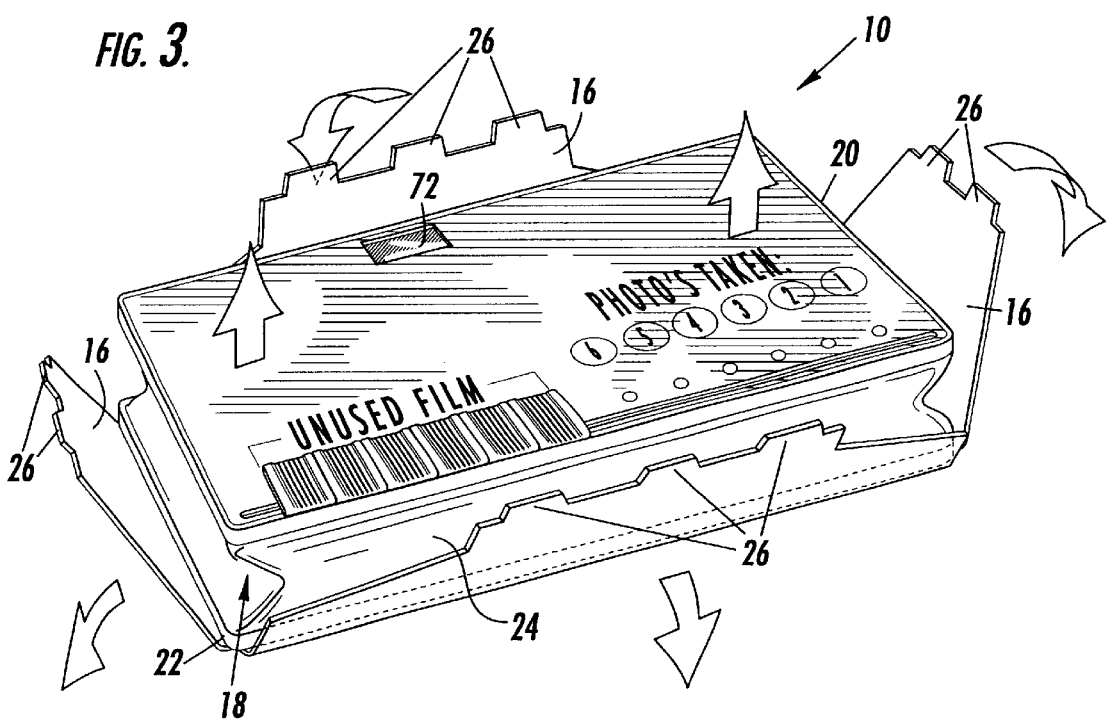
FIG. 3 is a perspective view of the credit card camera of FIG. 1 prior to positioning of the struts.
Figure 4:
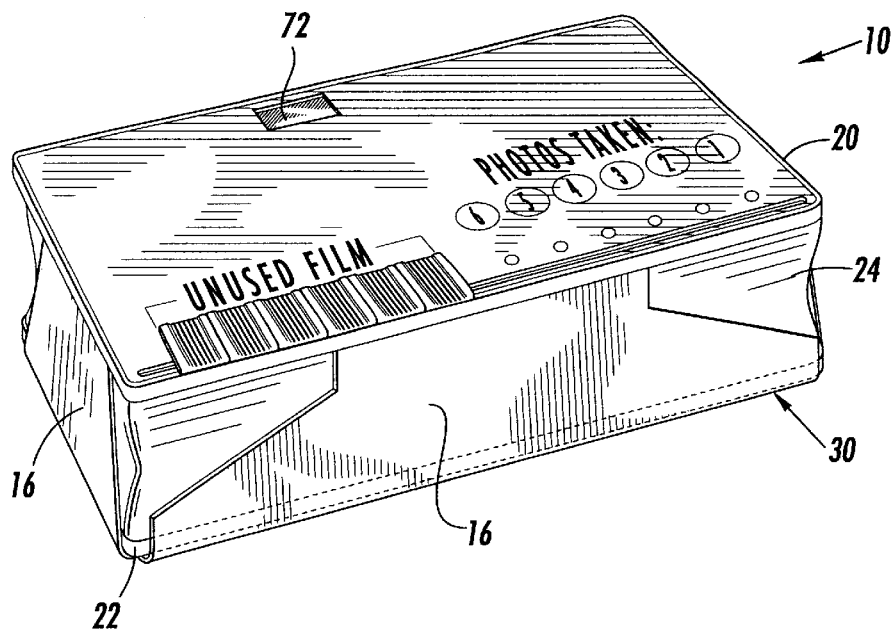
FIG. 4 is a perspective view of the credit card camera of FIG. 1 with struts in place in preparation for taking a picture.
Figure 5:
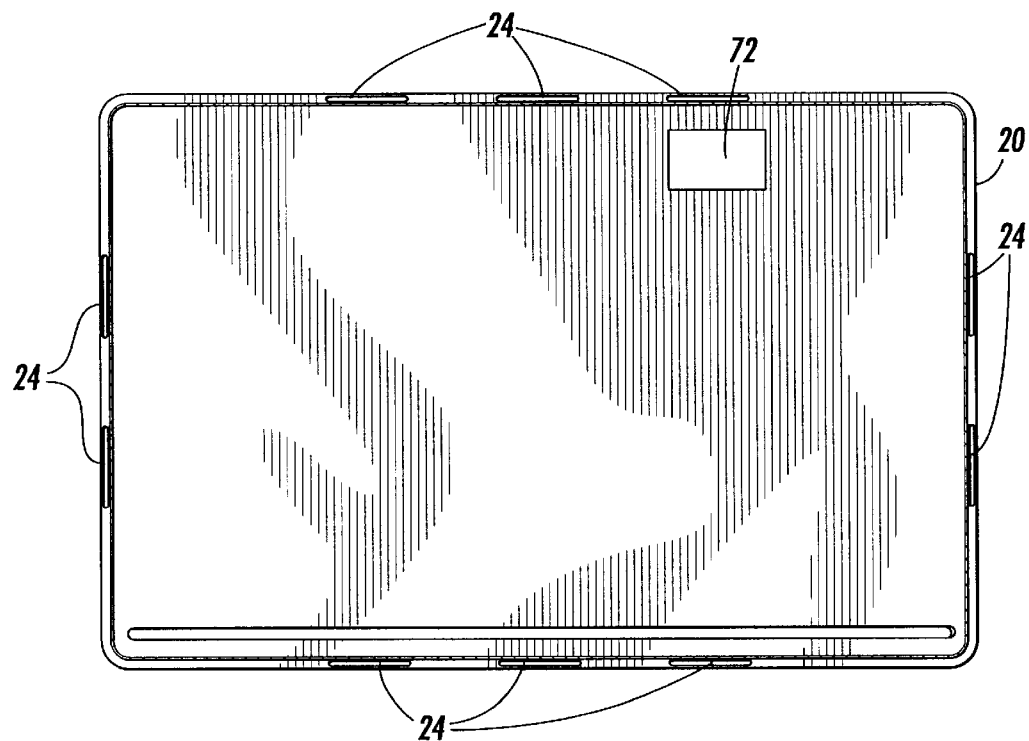
FIG. 5 is a bottom view of the rear panel of the credit card camera.

Turning now to FIGS. 2–5 the assembly of the credit card camera 10 for use is shown. As shown in FIG. 2, the label 12 affixed to the top of the camera 10 is removed to reveal a set of, preferably, four struts 16 and a collapsed camera body, generally referenced as 18. In FIG. 3, the struts 16 are pivoted open to allow for a rear panel 20 of the camera 10 to be pulled in an upward direction as indicated by the arrows. A front panel 22 and the rear panel 20 are connected to one another by a band of preferably light blocking material 24, such as Tyvek, vinyl, plastic, paper, or the like. The band of material 24 may be a single, unbroken band of material, or may consist of a broken band made up of an assemblage of more than one strip of material. Such material permits the front panel 22 to move relative to the rear panel 20, while preferably preventing light from entering the body of the camera 10, both may remain in an essentially planar state. Details of the operation of the camera 10 will be discussed in detail below. As seen in FIG. 5, the underside of the rear panel 20 includes a number of slots 24 for receipt of the protrusions 26 on the free ends of the struts 16 as seen in FIG. 3. In FIG. 4, the struts 16 are urged underneath the rear panel 20 so that the protrusions 26 on the free ends thereof engage and seat within the slots 24 on the underside of the rear panel 20. As a result, the struts 16 lock the rear panel 20 a predetermined distance away from the front panel 22 and hold both panels in rigid alignment. The rear panel 20 is retained on the struts 16 either due to a small spring-biasing force provided by the band of material 24 between the front panel 22 and the rear panel 20, or by the band of material 24 being of a near exact length so as to hold the struts 16 engaged and seated within the slots 24 on the underside of the rear panel 20. Protrusions 26 may also have abutment members on either side to enable them to lock into slots 24 for additional rigidity of the structure. Once the struts 16 are in place, the camera 10 is assembled and in condition for use. The length of the struts 16 and width of the band of material 24 between the front panel 22 and the real panel 20 provides the appropriate focal length of the lens 28, as shown in FIG. 6, employed in the camera 10 which imparts the scene to be photographed.

It should also be understood that since the credit card camera 10 is of a rectangular configuration, four struts 16 are preferred where one strut 16 is employed for each of the four sides of the body of the camera 10. If a different body configuration is used instead of one that is rectangular, the struts 16 may be modified accordingly. Similarly it should be understood that while the preferred embodiment of the present invention illustrates struts 16 located outside the band of material 24 which connects the front panel 22 to the rear panel 20, with the struts 16 being assembled by hand, the struts 16 may also be located inside of the described camera 10, and pulled into place by the action of the panels 20 and 22 being drawn apart, or by force provided by rubber bands, springs, or the like. The configuration of the camera 10 of the present invention may be adapted for use in a digital camera embodiment with the use of solid state imaging components, such as CCD and CMOS cameras, and the like.

Figure 6:
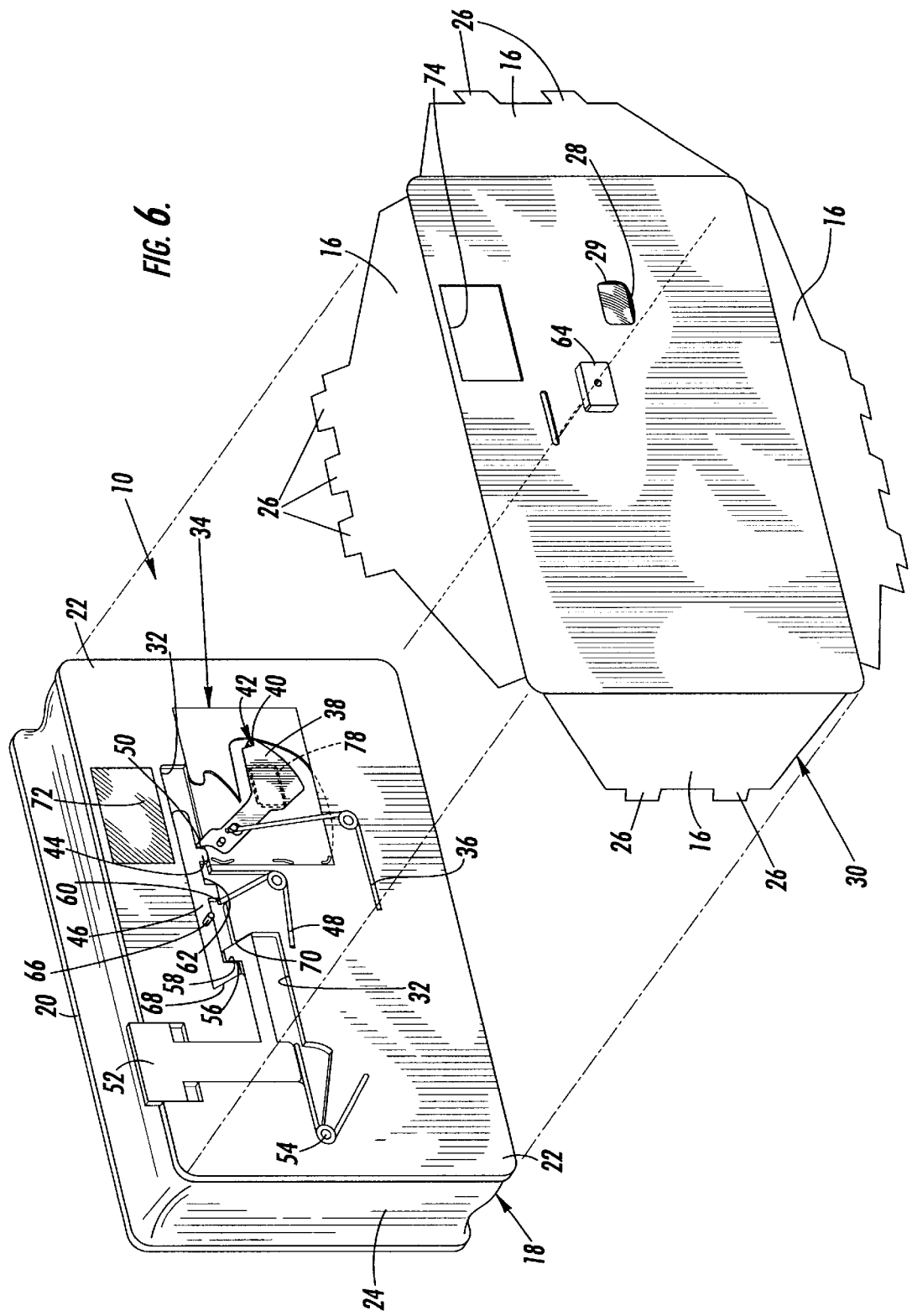
FIG. 6 is a front exploded perspective view of the credit card camera of FIG. 1 illustrating the shutter and lens mechanism.
Figure 7:
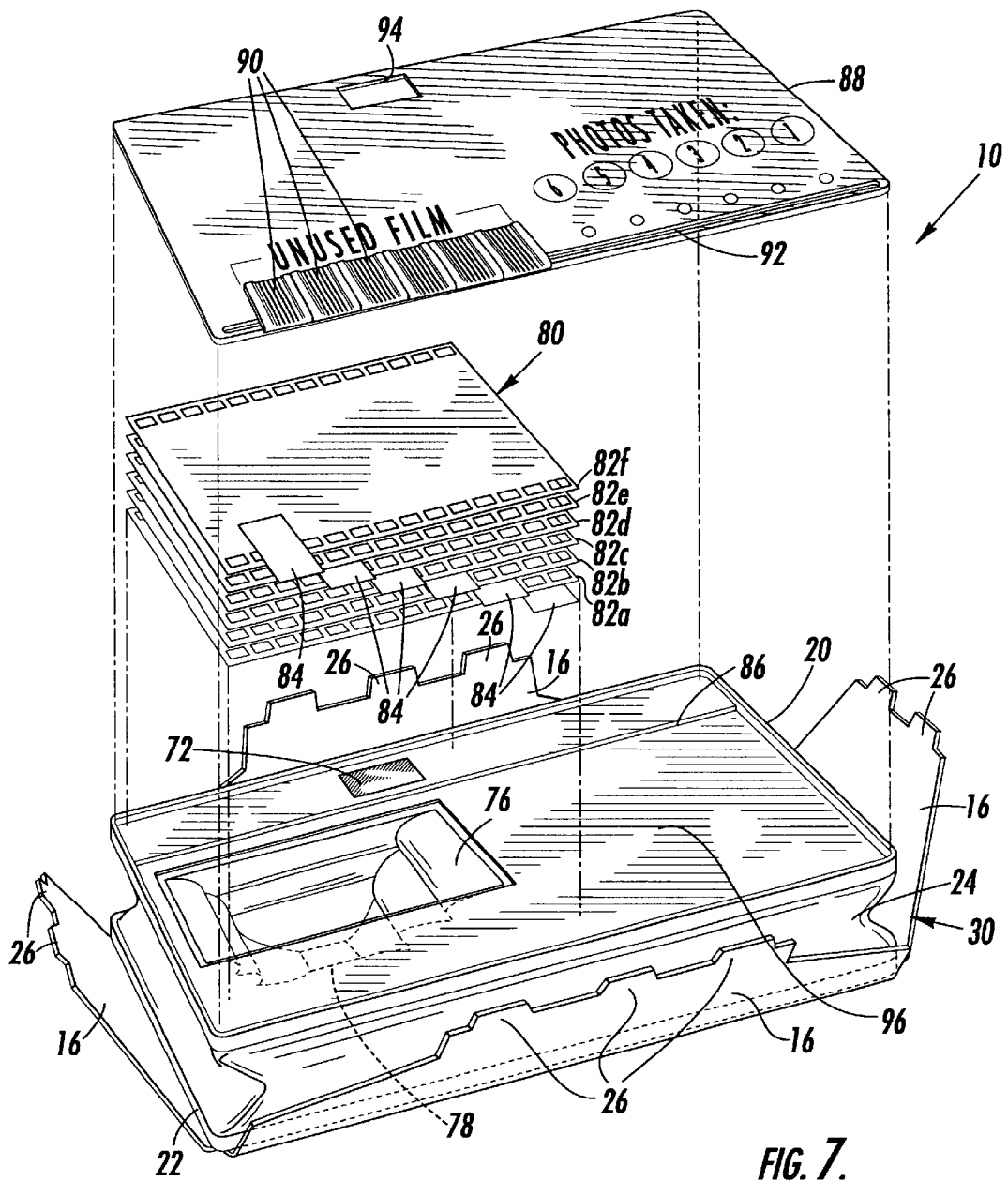
FIG. 7 is a rear exploded perspective view of the credit card camera of FIG. 1.

The construction of the credit card camera 10 of the present invention is shown in FIGS. 6 and 7. FIG. 6 illustrates a front exploded perspective view of the affixation of the outer camera shell 30 to the main body 18 of the camera 10 which includes the front panel 22, rear panel 20 and connective flexible material 24 therebetween. As described above, the front panel 22 is flexibly connected to the rear panel 20 by the flexible band of material 24. The front panel 22 includes a number of clearance cuts 32 to receive a number of components relating to the operation of the camera 10. A shutter mechanism 34 is provided with a shutter spring 36 to spring-bias a shutter plate 38 into a normally closed position. The shutter plate 38 is movable between an open position and a closed position controlled by a seat 40 and a stop 42. The upper free end of the shutter plate 38 engages with a first protrusion 44 on a striker 46. A striker spring 48 spring-biases the striker 46, by bearing on second protrusion 60, toward the right for engagement of the striker first protrusion 44 with the top edge 50 of the shutter plate 38. A trigger button 52 includes a portion that is exposed for pressing by the user and is spring-biased upwardly by the button spring 54. The free end of the button 52 includes a seat 56 to engage a corresponding seat 58 on the left free end of the striker 46.

In operation, the button 52 is depressed which causes the free end of the button 52 to disengage with the left free end of the striker 46. The striker 46 is driven to the right by the striker spring 48 which causes the first protrusion 44 of the striker 46 to pass over the shutter plate 38 for a sub-second thus causing the shutter 34 to open temporarily permitting light to enter through the lens 28 and shutter aperture 78 and into the camera 10 for exposure of the film therein.

A gap 62 behind the first protrusion 44 on the striker 46 enables the shutter plate 38 to return to its closed position. After a picture is taken, the striker 46 must be reset for the taking of another picture. A cocking button 64 connected to a striker post 66 emanating from the striker 46 is pulled toward the left so that the angled left edge 68 of the striker 46 rides over the angled right edge 70 of the button 52 to reseat the striker 46 on the button 52. During the cocking of the camera 10, the button 52 will temporarily move down then up when the striker 46 is camming over the free end of the button 52. A viewfinder 72 is also provided to assist in framing the scene to be photographed. A viewfinder aperture 74 is provided as a pass-through in outer shell 30 because the outer shell 30 is, as shown in FIG. 6, affixed directly to the outer surface of the front panel 22 to secure the camera components therein. A flash mechanism (not shown) may also be employed to assist in the exposure of the film, when needed. The outer shell 30 is preferably permanently, or semipermanently affixed to the front panel 22 by adhesive, attached together by hot weld, pop-through fasteners, or other methods which may be employed. With the outer shell 30 affixed in place, the struts 16 are positioned to seat under the rear panel 20 to maintain the camera 10 in an uncollapsible condition in preparation for use.

During use, it is preferred that the user hold the camera 10 by the front panel 22 in similar fashion to holding a card, as opposed to squeezing both the front panel 22 and rear panel 20 together, to avoid altering the focal length of the lens 28 and thus ruining the focus of the film.

It should be understood that the foregoing shutter and lens mechanism for a camera 10 is shown by way of example. Various other well-known and commercially available camera mechanisms may be used to effectively introduce light into the camera 10 of the present invention. Similarly, while the embodiment disclosed illustrates a camera 10 with lens 28 and aperture 29 mounted directly on the outer shell 30, the lens 28 and aperture 29 may also be mounted in an assembly above the shutter mechanism 34 on the front panel 22 itself, with an opening in the outer shell 30 permitting it to still be attached to the front panel 22. As will be apparent below, the lens 28 and shutter mechanism 34 are offset to the right half or region of the camera 10 in the preferred embodiment of the present invention. As will be described in detail below, the lens 28 and shutter mechanism 34 is offset because, preferably, an unexposed stack of film resides in one half of the camera 10 and is later moved to and stacked in the other half of the camera 10, enabling multiple photographs to be taken from a camera no larger than a credit card when in a collapsed state.

Alternatively, the lens 28 may be made more compact by mounting it on a spring, flexible rubber, or twist mechanism to extend. Upon assembling the camera 10, the lens in this alternative embodiment (not shown) extends to the appropriate length for use.

Figure 8:
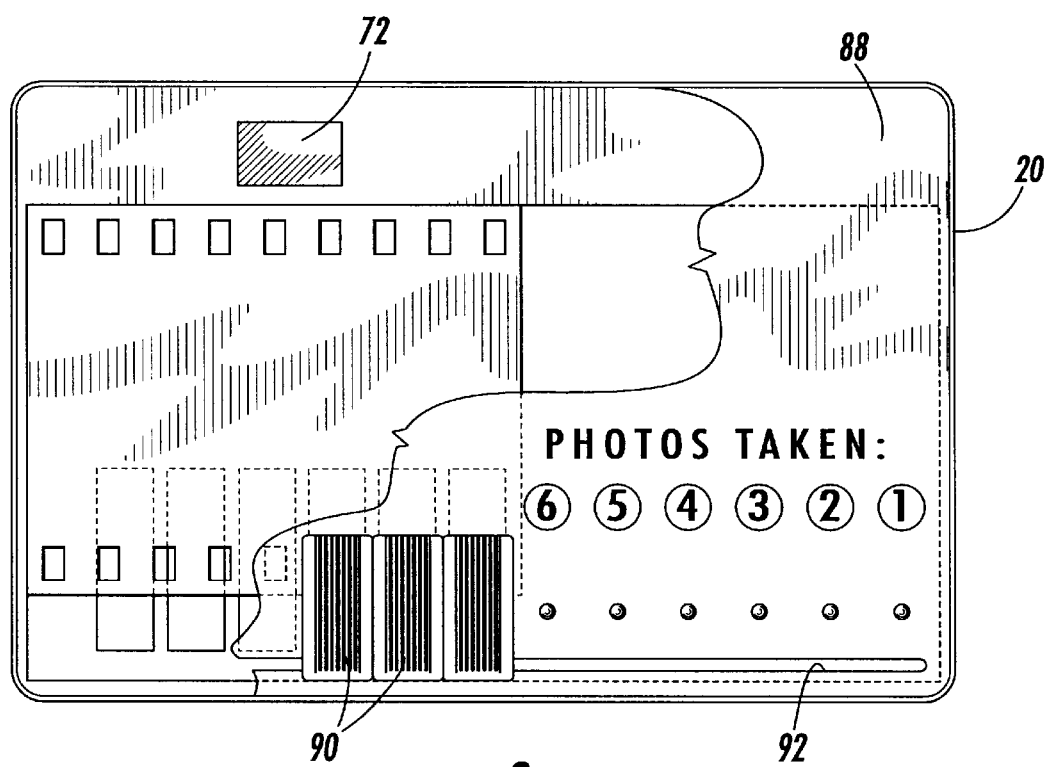
FIG. 8 is a rear elevational view of the credit card camera that is partially broken away to show the film transport within the camera.

Referring now to FIG. 7, a rear exploded perspective view of the camera 10 of the present invention is shown. The rear panel 20 includes an extendable bellows 76 and the viewfinder 72 as shown in FIG. 6. The extendable bellows 76 communicates with a light passageway that is lined with flexible light-blocking material, such as plastic, Tyvek, vinyl, paper, or the like. The light passageway terminates in the shutter aperture 78 on the front panel 22 for transmission of light. In the preferred embodiment of the present invention, a stack 80 of separate individual film frames 82 are provided, each with a corresponding tab 84, such as tape, connected on the top surfaces of film frames thereof. The film frames 82 are preferably of a 35 mm size and configuration so as to facilitate the developing thereof at a commonplace film development facility, but film 82 may be of other size. The stacked film frames 82 slidably reside in a track 86 formed in the rear panel 22 of the camera 10. A back cover 88 is positioned over the rear panel 20 and seals the stack 80 of film frames 82 therein. FIG. 8 further shows a rear elevational view of the camera 10 of the present invention with the back cover 88 partially broken away for illustration purposes. A number of buttons 90 are slidably received in a slot 92 running along the length of the back cover 88. A strip of light-blocking material (not shown), such as felt, may be positioned above the slot 92 to prevent light from exposing the film 82. The buttons 90 are affixed to corresponding tabs 84 connected to each of the individual film frames 82. The tabs 84 are positioned on different portions of the film frames 82 or are offset from one another to not overlap one another. The back cover 88 also includes a pass-through viewfinder aperture 94. The back cover 88 is preferably heat sealed to the rear panel 20 but may also be affixed by adhesive, or the like. Note that instead of tabs 84 manufactured of tape for connecting film frames 82 to buttons 90, each tab 84 may be a protrusion of film from the film frame, or the button 90 may be affixed by adhesive, pop-through connectors, or the like.

Figure 9:
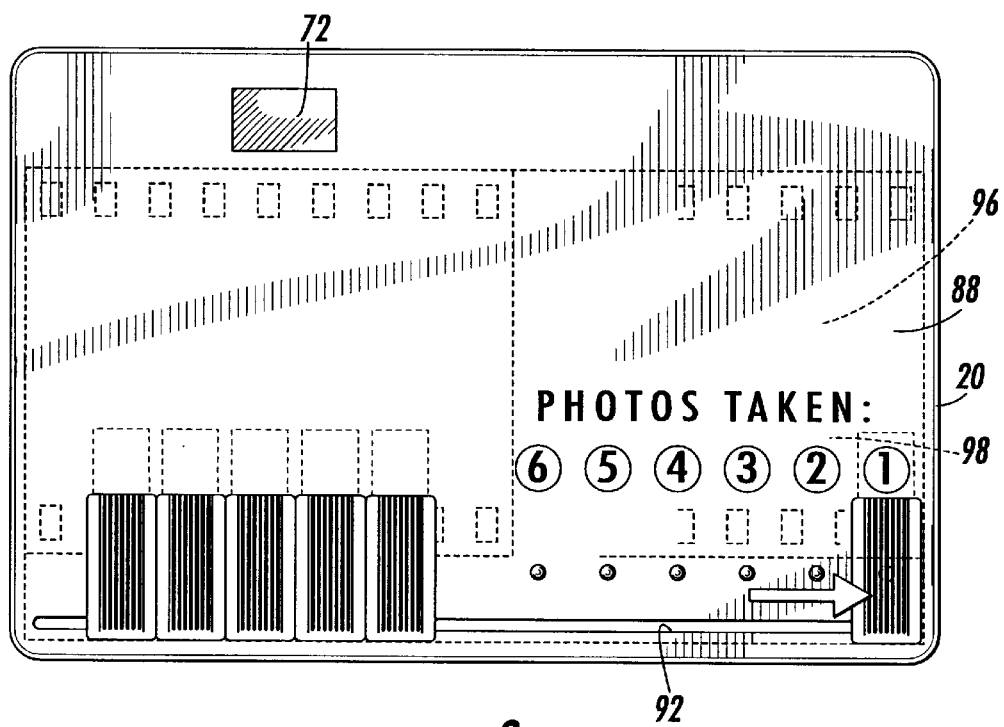
FIG. 9 is a rear elevational view of the credit card camera after one film frame has been exposed and stored.
Figure 10:
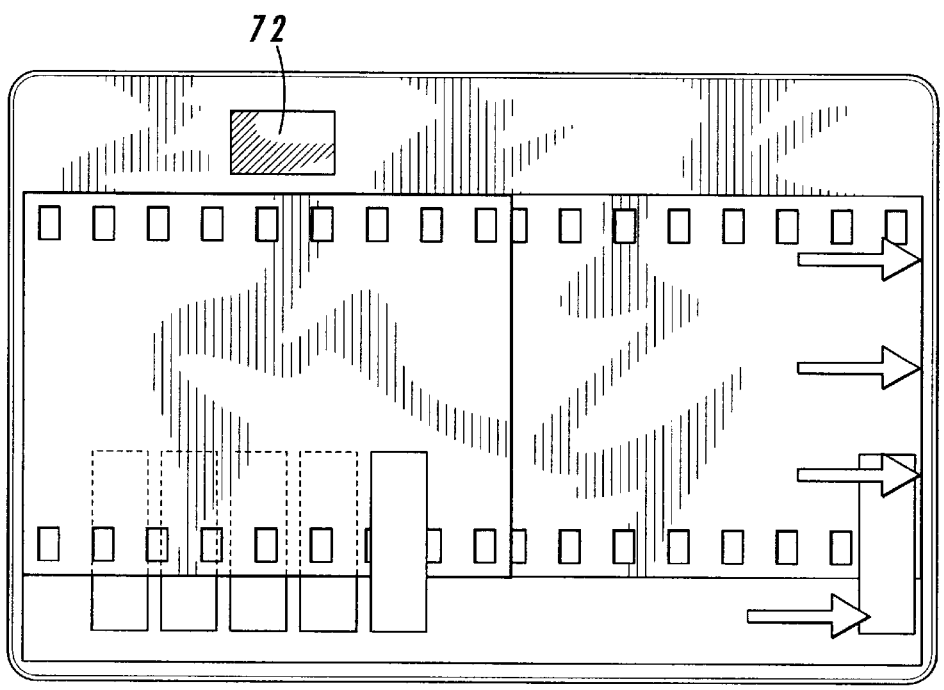
FIG. 10 is a rear elevational view of the credit card camera after one film frame has been exposed and stored with back cover removed for illustration purposes.
Figure 11:
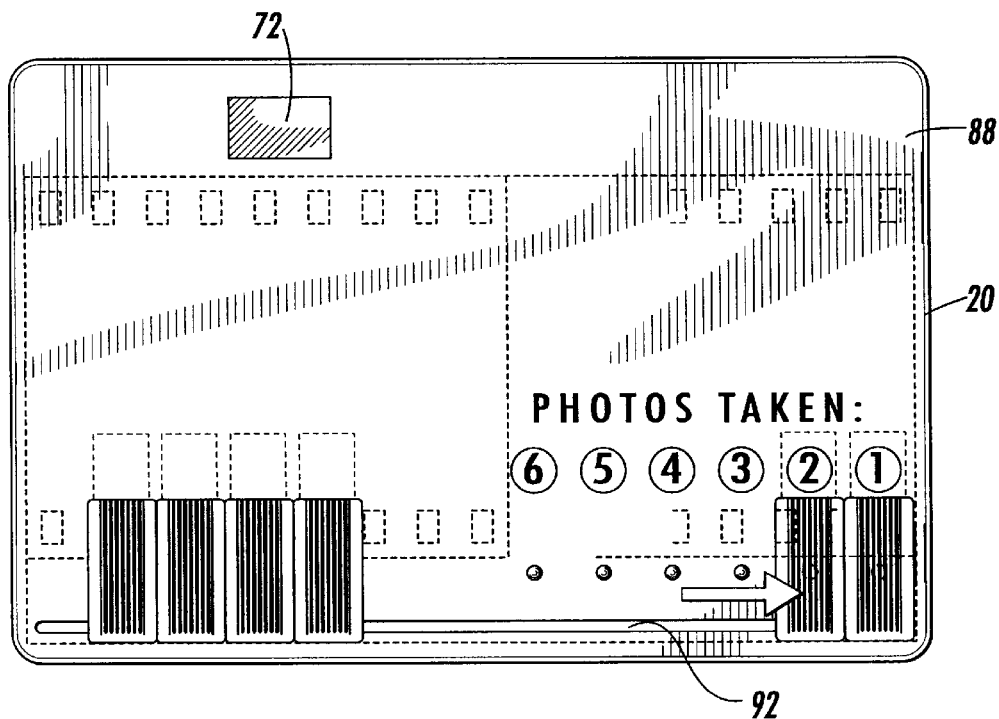
FIG. 11 is a rear elevational view of the credit card camera after two film frames have been exposed and stored.
Figure 12:
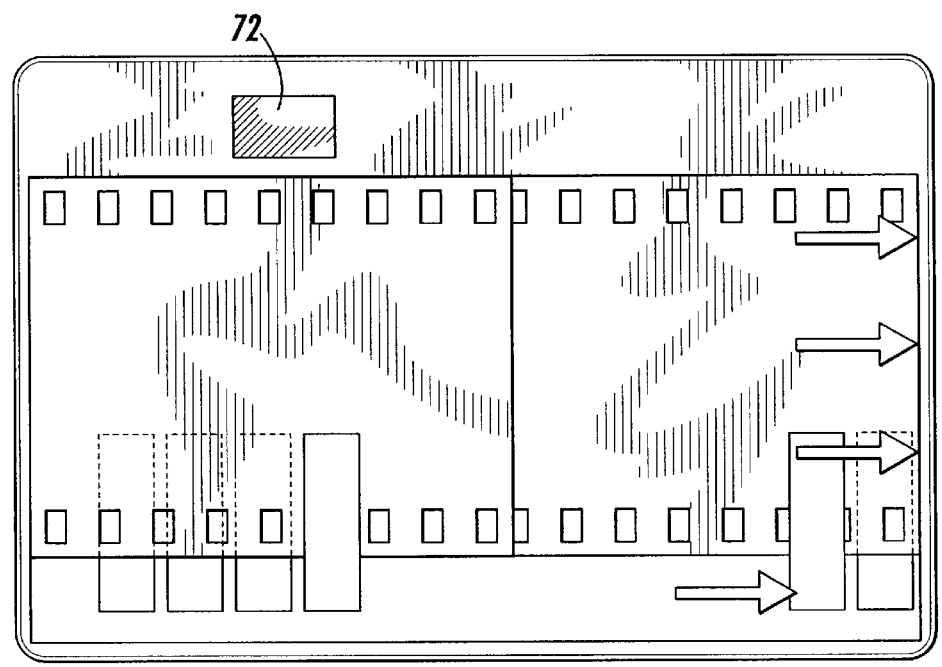
FIG. 12 is a rear elevational view of the credit card camera after two film frames have been exposed and stored with back cover removed for illustration purposes.
Figure 13:
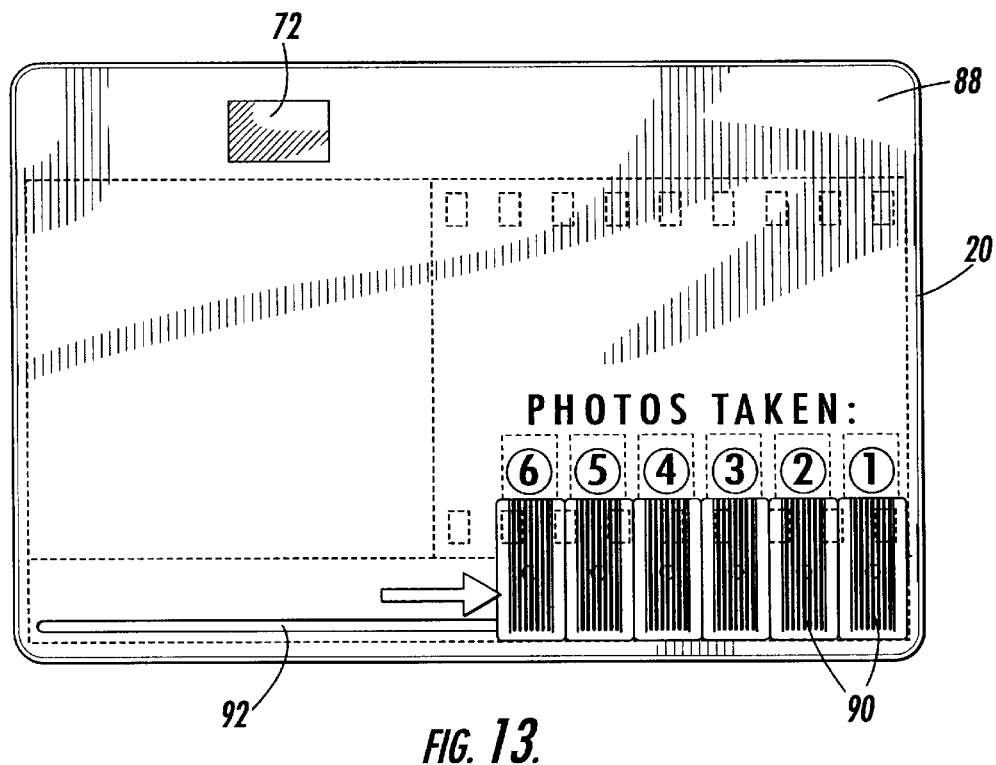
FIG. 13 is a rear elevational view of the credit card camera after all of the film frames have been exposed and stored.
Figure 14:
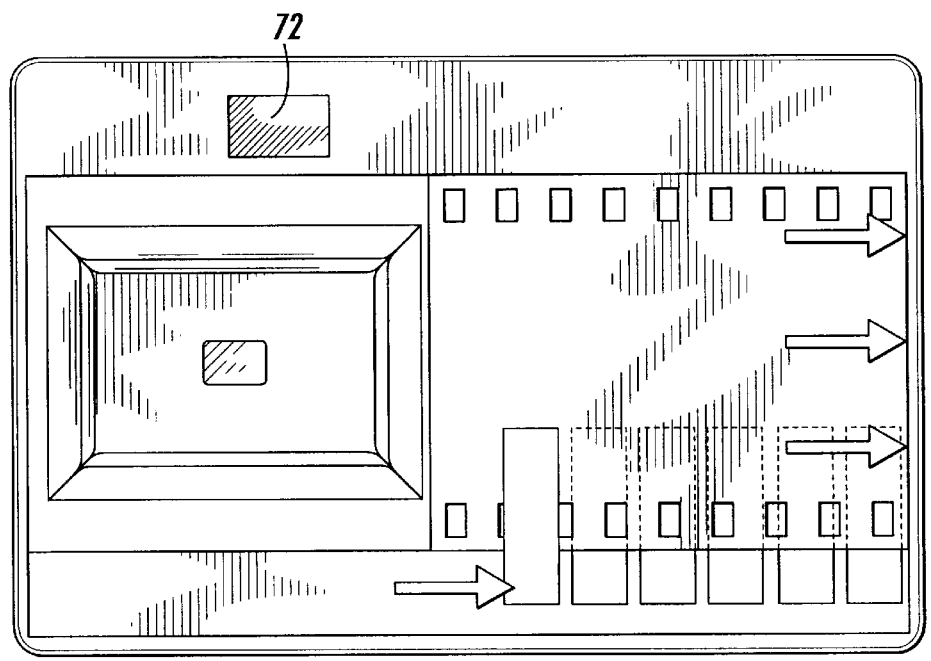
FIG. 14 is a rear elevational view of the credit card camera after all of the film frames have been exposed and stored with back cover removed for illustration purposes.

The preferred film transport of the present invention is shown in detail in FIGS. 9–14. In FIG. 8, all of the tabs 84 and corresponding buttons 90 are positioned to the left side of the camera 10 which is in line with the extendable bellows 76 for receipt of light therethrough. The film frame 82*a* closest to the extendable bellows 76 will be the first to be exposed to a photographic scene. The individual film frames 82 in the stack may have a light blocking backing material (not shown), made of dark colored plastic or the like, to eliminate the chance of light passing directly through the (frame 82 during exposure to partially expose and ruin the film frame 82 located underneath. This first frame 82*a* is connected to the first tab 84 which corresponds to the rightmost button 90 on the back cover 88. As shown in FIG. 9, after the first frame 82*a* is exposed with light, it is slid to the right within the track 86 in the rear panel 20 to a storage location 96 within the camera 10 positioned generally to the right of the extendable bellows 76. There may be a slight overlap between exposed film frames in storage location 96 and unexposed film frames behind expandable bellows 76 to permit unobstructed travel of film frames. Indicia 98 is provided on the back cover 88 to provide a visual indication to the user of how many photos have been taken. With back cover 88 removed for illustration purposes, FIG. 10 illustrates the sliding operation of the first frame of film 82*a* from its position for exposure to its storage position 96. In the exposure-ready position of the camera 10 in FIGS. 9 and 10, a second frame of film 82*b*, which is now in front of the extendable bellows 76 is ready for exposure. After the second frame 82*b* is exposed, it is slid to the right as shown in FIGS. 11 and 12 where it rests over the first frame 82*a* that has already been exposed. The third frame 82*c*, fourth frame 82*d*, fifth frame 82*e* and sixth frame 82*f* are similarly exposed and slid to the right so that they neatly nest in the storage region 96 to the right of the extendable bellows 76 within the light-protected body of the camera 10. A stack 80 of six frames 82 are shown by way of example, Stacks 80 of less than or greater than six frames 82 may be employed and still be within the scope of the present invention. FIGS. 13 and 14 shows the stacking and storage of the exposed film frames 82 in preparation for development.

In addition, the film 80 may moved from right to left, or from left to right during operation. As above, the film 80 is moved to the right for stacked storage after exposure. Alternatively, the film 80 may be initially stacked on the right side of the camera 10 and moved to the left for exposure. When all of the film frames 82 are exposed, a stack 80 of film frames 82 will be in the left region of the camera 10. Further, each of the film frames 82 may be held in a shallow curved position by forming approximately half of the rear panel 20 into a curved configuration to approximate the concavity of the field of the lens 28.

As an alternative to the separate individual film frames 82*a–f* of the preferred embodiment of the present invention, a film transport configuration in a fan folded film strip 100 may be employed. In FIGS. 15–18, a fan folded film strip configuration 100 is shown to include a number of film frames 102*a–c* to be exposed, and a number of carrier frames 104*a–c* which are each connected to respective pull tabs 106*a–c*. Each of the pull tabs 106*a–c* are routed through an exit slot in the body of the camera (not shown) but representationally shown as 108 in FIGS. 15–18, and which include indicia, such as a number, to identify the frame 102*a–c* that is being moved. The pull tabs 106*a–c* may be respectively attached to the carrier frames 104*a–c* or directly to the film itself. FIGS. 15–18 shown, by representation, the movement of the film frames 102*a–c* within a camera body. The camera body is not shown to clearly illustrate the film transport configuration of this alternative embodiment. The frames 102*a–c* are exposed from above.

In FIG. 15, a fan folded stack of film 100 is shown where a first film frame 102*a* is positioned with a light-sensitive side facing upwardly. The first tab 106*a* is attached to a carrier frame 104*a* which is connected to the first film frame 102*a*. After the first film frame 102*a* is exposed, FIG. 16 shows the first tab 106*a* is pulled to the right so that the first film frame 102*a*, that has just been exposed, is moved to the right a full frame length to a storage region, generally referenced as 110, from an exposure region, generally referenced as 112. Complete pulling of the first tab 106*a* causes the tab 106*a* to separate, or permit it to be torn off, from the first carrier frame 104*a* because, preferably, each of the tabs 106*a–c* are connected to their respective carrier frames 104*a–c* with the carrier frame 104*a–c* weakened about where the tab 106*a–c* is connected to a respective carrier frame 104*a–c*. For example, the center section of each carrier frame 104*a–c* may be scored or perforated so that the carrier frames 104*a–c* break away after their respective tab 106a–c has pulled the film frame 102a–c to its stored region 110 within the camera 10, while still permitting film frames 102a–c to remain connected by the remaining sides of the carriers frames 104a–c. In FIG. 16, the first tab 106a that has been separated and removed is shown in broken lines. Similarly, in FIG. 17, the second tab 106b is pulled to the right and removed thus transporting the second frame 102b from an exposure region 112 to a storage region 110 after it has been exposed. FIG. 18 further shows a third film frame 102c being drawn to the right into a storage region 110 by a third pull tab 106c which has been now removed. In view of the foregoing, the fan folded film configuration 100 effectively moves a stack of film frames 102a–c from an exposure region 112 on one side, to a storage region 110 on other side after exposure, to store the connected exposed film frames 102a–c completely within the camera body for later development processing. As discussed above, it is preferred that the center of carrier frames 104a–c break away during movement but it is also possible to make the carrier frames 104a–c not break away during film transport. In such an embodiment, the carrier frames 104a–c would not be scored for a center section to break away, but would remain wholly intact during and after transport to the storage region 110.

As discussed above, the alternative fan folded film configuration 100 above includes carrier frames 104a–c that are interdispersed between film frames 102a–c to be exposed. In this fan folded configuration 100, the film media in the region of the carrier frames 104a–c is required to roll over itself to effectuate the transfer of the frames 102a–c from one side of the camera 10 to another. In the embodiment in FIGS. 15–18, the carrier frames 104a–c are unused portions of the film media on which the film frames 102a–c are intended to be exposed. As a result, the carrier frames 104a–c are of the same material as the film frames 102a–c to be exposed. However, the film media is frequently too thick and may make the carrier frames 104a–c rolling over themselves difficult, therefore carrier frames 104a–c may be made of flexible material such as plastic or the like.

In the further alternative embodiment of FIG. 19, the individual film frames 114 are mounted onto a flexible strip of material 116, such as plastic with spaces in between, to address the aforementioned problem with the thickness of the carrier frames and the difficulty in the material rolling over itself. FIG. 19 shows the fan folded film strip 118 in an opened condition for illustration purposes. The flexible web 116 carries the exposable film frames 114. The spaces 120 between the exposable film frames 114 serve as and are analogous to the carrier frames 104a–c in the fan folded configuration 100 of FIGS. 15–18. The configuration 118 of FIG. 19 is fan folded in similar fashion to the configuration 100 shown in FIGS. 15–18 where pull tabs (not shown) are affixed to the spaces 120 or to the back of film frames 114 to effectuate movement of the film frames 114 from an exposure region 112 to a storage region 110 within the camera 10. Since the web 116 is very flexible and thereby the effective "carrier frames" are flexible, the transport from an exposure region 112 to a storage 110 is greatly facilitated. The web 116 may be a continuous whole strip of opaque or transparent flexible material or a combination thereof, or preferably openings may be formed in web 116 beneath film frames 114 during manufacture of film strip 118 to simplify photo printing during development by enabling light to pass through the openings, such as the light from an enlarger lamp.

As with the previously described embodiment utilizing separate individual film frame 82a–f, both of the connected fanfold film alternatives may utilize individual tabs and buttons in lieu of pull tabs to move the film. Similarly, as previously described, these alternatives may move the film from left exposure position to right storage position 96 during operation, or from right storage position to left exposure position during operation.

The present invention has a significant advantage over prior art cameras in that it is compact yet still can employ 35 mm film. If the preferred film stack 80 film transport is employed, as in FIG. 7, for example, the film frames 82a–f can be easily prepared for linear film strip feeding into standard film processing equipment. In accordance with the present invention, in a dark room, light-blocking bag or box, the individual film frames 82a–f may be linked together into a strip. FIG. 20 illustrates the interconnection of individual film frames 82 by adhesive tape 122 or film to provide a continuous strip suitable for loading into a circular film holder (not shown) for development and processing. Similarly, in FIG. 21, the individual film frames 82 may be interconnected together by directly adhering the frames 82 to one another. An overlapping edge 124 is affixed to an adjacent frame 82.

Figure 22:
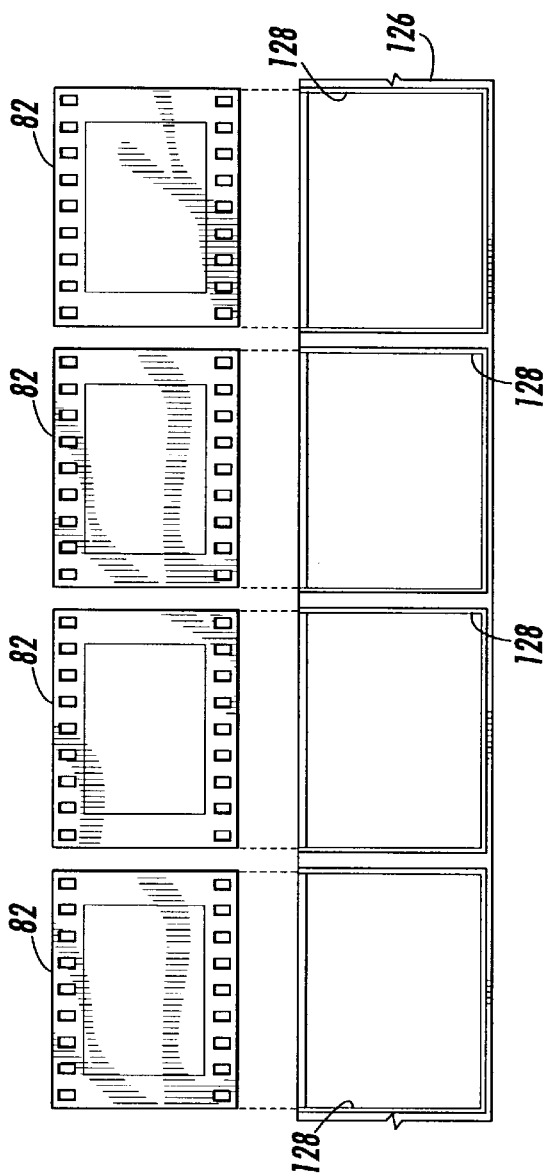
FIG. 22 is a third alternative photographic film web for developing a number of film frames using standard photographic development equipment.
Figure 23:
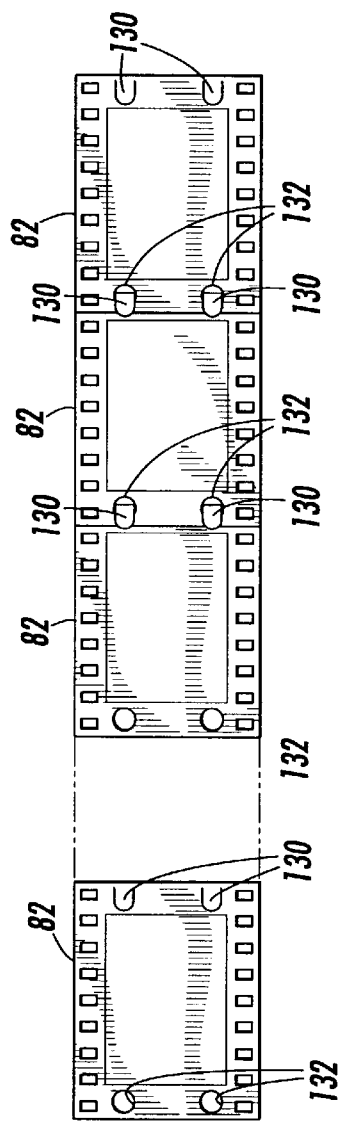
FIG. 23 is a fourth alternative photographic film web for developing a number of film frames using standard photographic development equipment.

In FIG. 22, a carrier frame 126 includes pockets 128 for receiving the individual frames 82 for processing. The sides of pockets 128 are open to permit exposure of film developing chemicals to the individual film frames 82. In addition, in FIG. 23 fasteners 130 and apertures 132 may be die cut or attached into the opposing edges of the individual film frames 82 so that they may be linked together to form a continuous strip for processing. Alternatively, as in FIG. 24 and FIG. 25, individual film frames 82 may be connected together by means of a separate fastener 134 which includes a base 136 and a pair of posts 138 positioned through opposing notches 140 of film frames 82 to form a continuous strip for processing, or both sides of individual film frames 82 may have holes 132 formed to enable individual film frames 82 to be connected with separate fastener 134. Still further, an individual fastener 134 may be used as an alignment tool to align exposed film frames 82 together for adhering them to create a continuous strip of easily processed film frames. Employed in this manner, the pair of posts 138 are positioned through an overlapping pair of opposing notches 140 in the sprocket pattern of each individual film frame 82 during alignment of each adjacent frame for adhering them together. Or, alternatively both sides of individual film frames 82 may have holes 132 enabling individual frames 82 to be connected with a fastener. Still further, as in FIG. 24 and FIG. 25, an alignment tool 134 may be employed to align exposed film frames 82 together for adhering the frames together to create a continuous strip of easily processed film frames. The tool 134 includes a base 136 and a pair of posts 138 that are positioned through an overlapping pair of opposing notches 140 in the sprocket pattern of each individual film frame 82 during alignment. The tool is used for aligning each adjacent film frame for adhering them together.

Figure 26:
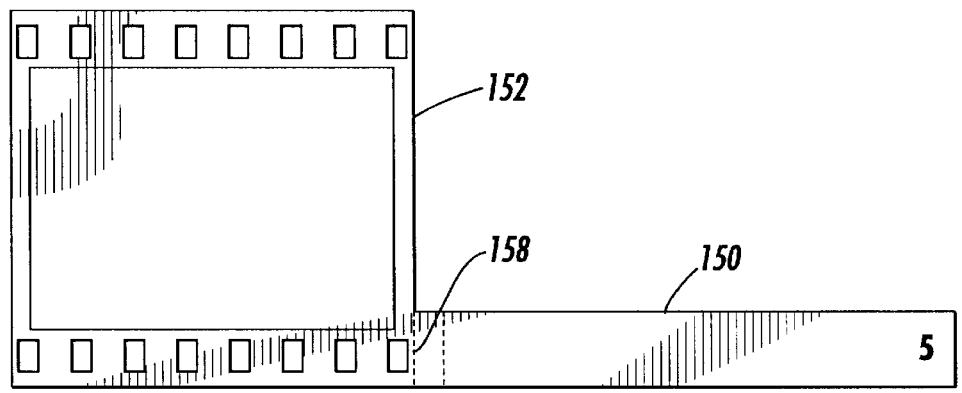
FIG. 26 is plan view of a film frame in accordance with an alternative embodiment of the present invention.
Figure 27:
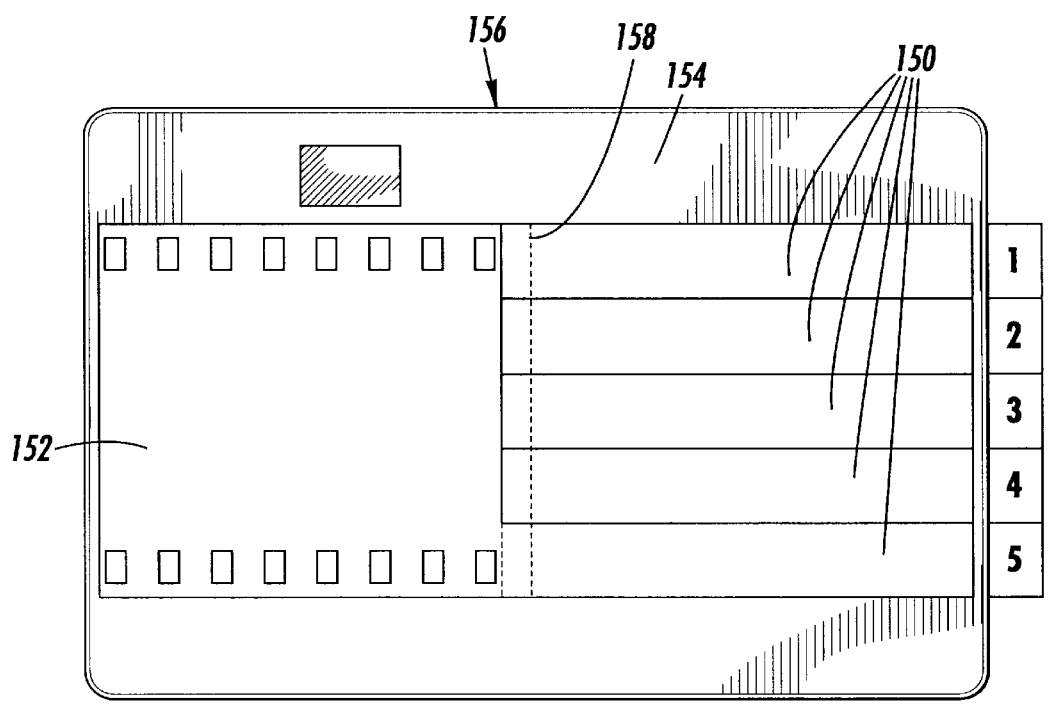
FIG. 27 is a plan view of a stack of film frames residing in a camera body in accordance with an alternative embodiment of the present invention.

FIG. 7 illustrates a preferred embodiment of a stacked film frame configuration with individual film frames 82a–f. However, the configuration of the individual film frames 82a–f may be modified and still be within the scope of the present invention. For example, as shown in FIGS. 26 and 27, the pull tab 150 for each film frame 152 may emanate laterally as opposed to downwardly as shown in the preferred embodiment as shown in FIG. 7. Similarly, as shown in FIGS. 26 and 27, each pull tab 150 is connected to or part of a corresponding film frame 152 in a staggered manner so that the pull tabs 150 do not overlap one another. When located in the rear panel 154 of the camera 156, they easily slide from left to right (or right to left if a reverse configuration is used) by pulling on the corresponding pull tab 150 that emanates from the body of the camera 156. The pull tab 150, in this embodiment, includes a perforation 158 to facilitate separation of the pull tab 150 from the film frame 152 after the respective frame 152 has been moved to a storage position subsequent to exposure.

Figure 28:
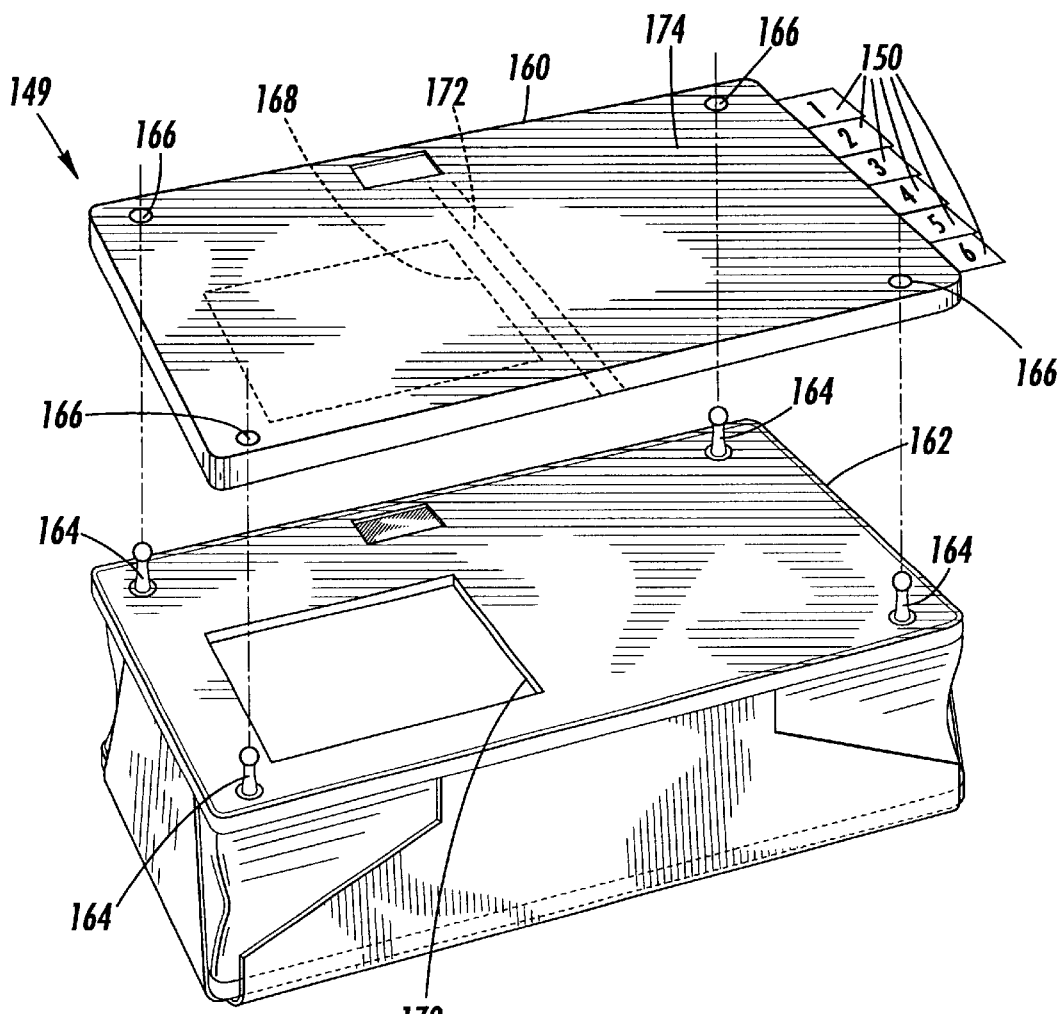
FIG. 28 is a perspective view of a film cartridge being installed on a camera body in accordance with another alternative embodiment of the present invention.
Figure 29:
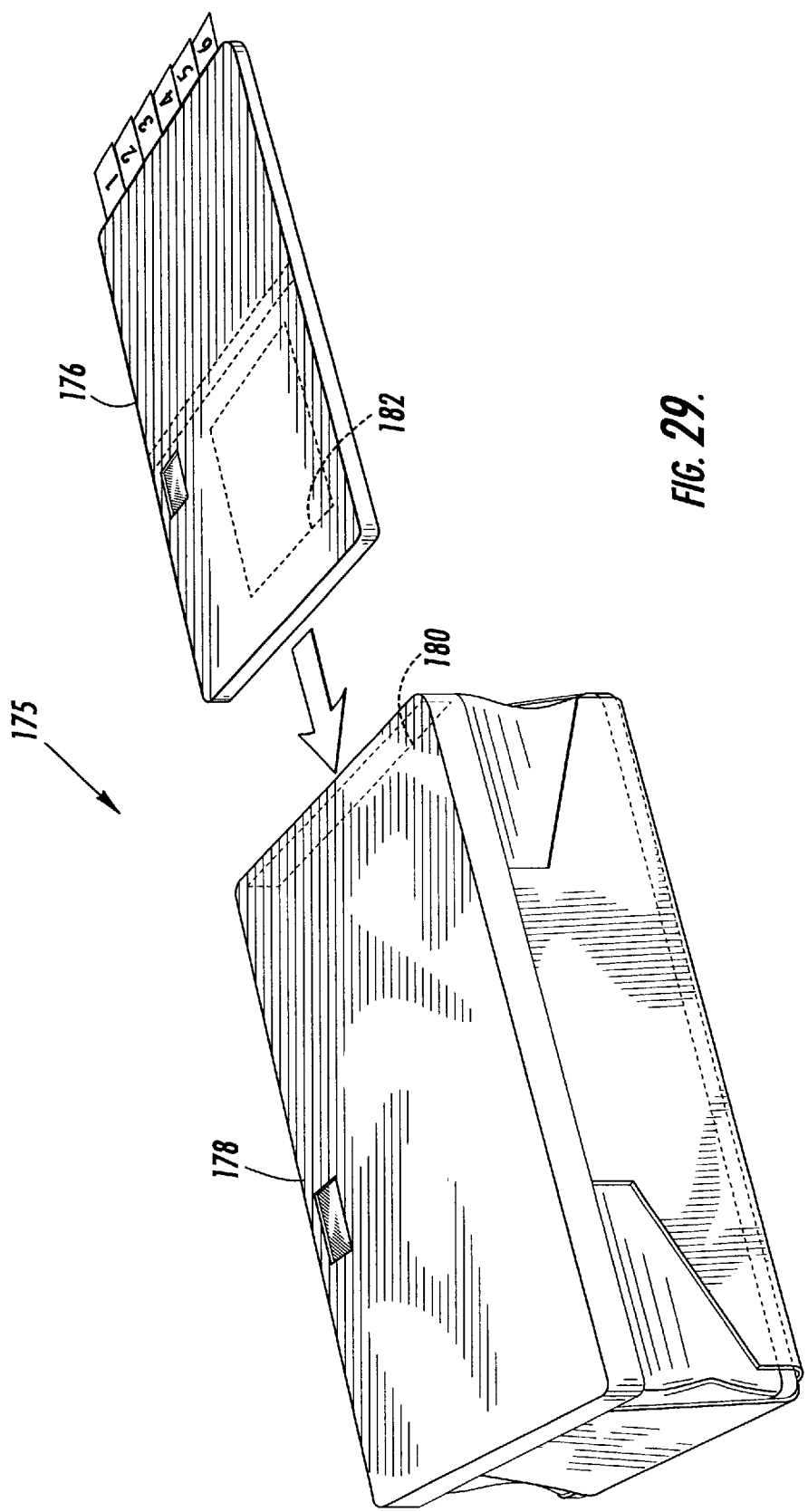
FIG. 29 is a perspective view of a film cartridge being installed on a camera body in accordance with yet another alternative embodiment of the present invention.

Still further, FIGS. 28 and 29 illustrate two alternative embodiments of the present invention where a removable cartridge carries the film frame stack to be exposed. The film can be provided within a cartridge that is affixed to the back of a camera or that is inserted into the camera itself. This cartridge provides the same functionality as described above. Such a cartridge includes a region for housing a stack of film to be exposed as well as an adjacent region for storing the stack of film that has been exposed. This cartridge permits the movement of the film from the exposure region to the storage region while maintaining a flat compact form factor. Such a cartridge facilitates use of the camera, particularly development of the film therein.

Specifically, FIG. 28 provides an alternative embodiment 149 with a cartridge 160 that connects to the camera body 162 via a number of "pop-on" fasteners 164 which emanate from the camera body 162. The cartridge 160 includes a corresponding number of through-holes 166 to receive the fasteners 164 to retain the cartridge 160 in frictional engagement with the camera body 162. The cartridge 160 includes a light receiving aperture 168 which is aligned with the light passageway 170 of the camera body 162. A light-blocking felt 172 is also provided and divides the left side of the cartridge 160 from the right side of the cartridge 160.

The cartridge is removably affixed to the back of the camera 162 so that the light receiving aperture 168 of the cartridge 160 and the light passageway 170 of the camera body 162 are aligned with one another. The first pull tab 150, such as the tab labeled No. 1, is preferably a light blocking sheet. The remaining frames are actual film frames that are exposable. This enables the cartridge 160 to be easily installed without exposing the film frames therein. As the film frames are exposed, their respective pull tabs 150 are pulled to move each now exposed film frame along an internal track to the right side of the cartridge 160 for storage until development. Each pull tab 160 is severed from the film frame after the film frame has been moved. The remaining film frames are similarly exposed and then drawn to the right for storage. The felt barrier prevents light from entering the storage portion 174 of the cartridge 160 to prevent destruction of the properly exposed film frames. Once all of the film frames have been exposed and moved into a protected stored position 174, the cartridge 160 is detached from the camera body 162 for the appropriate development processing.

FIG. 29 provides a further embodiment 175 to the cartridge configuration 149 shown in FIG. 28. In the alternative embodiment 175 of FIG. 29, the structure for removably connecting the cartridge 176 to the main camera body 178 is slightly modified. In particular, a side slot 180 is provided to receive the cartridge 176 which is substantially identical to the cartridge 160 shown in FIG. 28. In FIG. 29, the through-holes 166 in the cartridge 160 are not needed in the cartridge 176 because the cartridge 176 is inserted laterally into the slot 180 in the camera body 178 so that the light receiving aperture 182 in the cartridge 176 aligns with the light passageway (not shown in FIG. 29) to properly expose the individual film frames. While a side access slot 180 and pop-on fasteners 164 and through-holes 166 are shown in FIGS. 28 and 29, other attachment structures, such as clasps and adhesive, or an Instamatic-style access door may be employed to receive a cartridge and still be within the scope of the present invention.

It will be appreciated by those skilled in the art that various changes and modifications can be made to the illustrated embodiments without departing from the spirit of the present invention. All such modifications and changes are intended to be covered by the appended claims.

What is claimed is:

1. A photographic turn web, comprising:
a plurality of non-instant unbacked photographic light-sensitive film frames and a plurality of opaque carrier frames; each of said non-instant unbacked photographic light-sensitive film frames having sprocket holes on at least one side;
said non-instant unbacked photographic light-sensitive film frames being interconnected together by means of said opaque carrier frames to form a continuous web of film frames suitable for exposure and storage within a camera and for developing using standard photographic development equipment.

2. The photographic film web of claim 1, wherein said photographic light-sensitive film frames are 35 mm film frames.

3. The photographic film web of claim 1, wherein said plurality of separate individual non-instant unbacked photographic light-sensitive film frames are interconnected in a fanfolded configuration.

4. A photographic film web, comprising:
a an opaque carrier web;
a plurality of separate individual non-instant unbacked photographic light-sensitive film frames affixed to said opaque carrier web in spaced apart relation to one another; said opaque carrier web defining a plurality of pass-through apertures respectively corresponding to and aligned with said plurality of separate individual non-instant unbacked photographic light-sensitive film frames; said plurality of pass-through apertures permitting exposure of said separate individual non-instant unbacked photographic light-sensitive film frames during development thereof;
whereby said separate individual photographic light-sensitive film frames are positioned relative to one another to form a continuous web of film frames suitable for exposure and storage within a camera and for developing after exposure using standard photographic development equipment.

5. The photographic film web of claim 4, wherein said separate individual non-instant unbacked photographic light-sensitive film frames are 35 mm film frames.

6. The photographic film web of claim 4, wherein said opaque carrier web is a flexible strip of material.

7. The photographic film web of claim 4, wherein said plurality of separate individual non-instant unbacked photographic light-sensitive film frames are interconnected in a fanfolded configuration.

* * * * *